United States Patent
Hendrix

(10) Patent No.: US 11,699,390 B2
(45) Date of Patent: Jul. 11, 2023

(54) HYBRID SWITCHED CAPACITOR CIRCUIT WITH AUTOMATIC CHARGE BALANCING

(71) Applicant: SIGNIFY HOLDING B.V., Eindhoven (NL)

(72) Inventor: Machiel Antonius Martinus Hendrix, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/801,418

(22) PCT Filed: Feb. 22, 2021

(86) PCT No.: PCT/EP2021/054295
§ 371 (c)(1),
(2) Date: Aug. 22, 2022

(87) PCT Pub. No.: WO2021/170529
PCT Pub. Date: Sep. 2, 2021

(65) Prior Publication Data
US 2023/0078180 A1 Mar. 16, 2023

(30) Foreign Application Priority Data
Feb. 27, 2020 (EP) .................................... 20159658

(51) Int. Cl.
*G09G 3/32* (2016.01)
*G09G 3/20* (2006.01)

(52) U.S. Cl.
CPC ............ *G09G 3/32* (2013.01); *G09G 3/2096* (2013.01); *G09G 2330/021* (2013.01)

(58) Field of Classification Search
CPC ........ G09G 3/32; G09G 3/325; G09G 3/3258; G09G 3/3291; G09G 3/2096; G09G 2330/021
See application file for complete search history.

(56) References Cited

U.S. PATENT DOCUMENTS

| | | | | |
|---|---|---|---|---|
| 11,522,466 B1* | 12/2022 | Li | .................. | H02M 7/4837 |
| 11,539,296 B2* | 12/2022 | Liu | ................. | H02M 3/1584 |
| 11,557,983 B2* | 1/2023 | Zmood | ............... | H02M 7/487 |
| 11,563,370 B2* | 1/2023 | Pettersson | ............. | H02M 7/487 |

(Continued)

FOREIGN PATENT DOCUMENTS

| | | |
|---|---|---|
| EP | 3506479 A1 | 7/2019 |
| WO | 2014028441 A2 | 2/2014 |

(Continued)

*Primary Examiner* — Vijay Shankar

(57) ABSTRACT

An electronic module comprising an input capacitor connected between a first and second node; a first and second switch connected in series between the first and second node and the second node, in parallel with the input capacitor, and defining an intermediate node at their interconnection; a voltage regulator configured for receiving power from the input capacitor and for providing output power at a configurable voltage (out) between an output node and the second node. A multi-output power supply system comprising three such modules. A LED-driver comprising such module. A multi-color LED driver comprising three modules. A solid state lighting device comprising three modules and three LEDs.

11 Claims, 13 Drawing Sheets

(56) References Cited

U.S. PATENT DOCUMENTS

| | | |
|---|---|---|
| 11,567,519 B2 * | 1/2023 | Lee .................. H02M 1/007 |
| 2004/0246755 A1 | 12/2004 | Isii et al. |
| 2008/0239772 A1 | 10/2008 | Oraw et al. |
| 2009/0295300 A1 | 12/2009 | King |
| 2014/0159681 A1 | 6/2014 | Oraw et al. |
| 2019/0363644 A1 | 11/2019 | Li et al. |
| 2019/0372457 A1 | 12/2019 | Zhang et al. |
| 2023/0005653 A1 * | 1/2023 | Dube .................. H01F 27/40 |

FOREIGN PATENT DOCUMENTS

| | | |
|---|---|---|
| WO | 2015040564 A1 | 3/2015 |
| WO | 2016110413 A1 | 7/2016 |

* cited by examiner

HYBRID SWITCHED CAPACITOR CIRCUIT WITH AUTOMATIC CHARGE BALANCING

CROSS-REFERENCE TO PRIOR APPLICATIONS

This application is the U.S. National Phase application under 35 U.S.C. § 371 of International Application No. PCT/EP2021/054295, filed on Feb. 22, 2021, which claims the benefit of European Patent Application No. 20159658.2, filed on Feb. 27, 2020. These applications are hereby incorporated by reference herein.

FIELD OF THE INVENTION

The present invention generally relates to the field of power convertor circuits and LED-driver circuits, and more particularly to hybrid switched capacitor circuits (H-SCC) for driving at least three Light Emitting Diodes (LEDs), and to an integrated chip (module) for building a multi-LED system, and to a multi-LED system, and to a method of building such a multi-LED system, and to methods of powering such a multi-LED system.

BACKGROUND OF THE INVENTION

DC-DC converters for generating an output voltage higher or lower than an input voltage, are known in the art. Examples are: a linear converter, a buck converter, a switched capacitor circuit (SCC), a switched inductor circuit (SIC), as well as hybrid circuits where two or more of the above mentioned converters are used. Each of these circuits has advantages and disadvantages in terms of power efficiency, maximum power dissipation, integration level (e.g. single chip, single package, PCB with multiple discrete components), maximum switching frequency, reliability, modularity, etc. DC-DC converters exist in many flavours. It will be appreciated that DC-DC converters for high-power applications, e.g. for converting kilowatts or Megawatts, e.g. as can be generated by wind turbines or solar panel, are completely different from DC-DC convertors for powering low-power devices from a battery. The present invention is primarily directed to the latter category, where consumption of each load to be powered is less than 25 Watt.

The present invention is also related to light emitting diodes, abbreviated as LEDs. A basic knowledge of LEDs is sufficient for understanding the principles of the present invention. A good introduction to LEDs and LED drivers can be found in chapter 2 of the master thesis "Hybrid switched converters for CMOS integrated LED drivers", by Castellanos Rodriguez, J. C. (2018), Technische Universiteit Eindhoven, incorporated herein by reference in its entirety, and referred to as [1], or as "the thesis".

This thesis also describes hybrid switched capacitor circuits for driving multi-LED systems. While these circuits are very promising, they still pose some problems, for example in terms of balancing the input voltages of the different modules, and in terms of compactness, and level of integration and thus cost. However, the solutions proposed by the present invention are not limited to light emitting devices, but can also be used for other circuits where multiple voltages need to be generated.

There is always room for improvements or alternatives.

SUMMARY OF THE INVENTION

It is an object of embodiments of the present invention to provide an electronic circuit (also referred to herein as "module"), as a building-block for a multi-power supply system (e.g. a multi-voltage DC-DC converter) comprising at least three such modules.

It is also an object of embodiments of the present invention to provide a multi-power supply system.

It is an object of embodiments of the present invention to provide a system comprising at least one module, or at least two modules, or at least three modules, wherein each module is capable of providing a configurable output voltage or output current.

It is an object of embodiments of the present invention to provide such a system, wherein the output voltages (or output currents) of some or all of the modules can be configured individually and independently of the other output voltages (or output currents).

It is an object of embodiments of the present invention to provide a multi-LED driver circuit capable of driving at least two Light Emitting Diodes (LEDs), and/or which may be embedded in a single integrated circuit (e.g. single semiconductor substrate), or which may be embedded in a single package (e.g. in the form of an encapsulated semiconductor device).

It is an object of embodiments of the present invention to provide a multi-LED driver circuit capable of driving at least two Light Emitting Diodes (LEDs) independently.

It is an object of embodiments of the present invention to provide a multi-LED driver circuit capable of driving at least two Light Emitting Diodes (LEDs) configured for transmitting light of different colours or different wavelengths.

It is an object of embodiments of the present invention to provide a multi-LED driver circuit capable of dimming the light generated by the LEDs.

It is an object of embodiments of the present invention to provide an electronic device comprising a multi-LED driver circuit and at least two Light Emitting Diodes (LEDs), for example in the form of a single chip or a single package comprising one or more semiconductor dies.

It is an object of embodiments of the present invention to provide a single-chip or single package comprising: a tri-color LED driver circuit and three LEDs of different colour or different wavelength.

It is an object of embodiments of the present invention to provide a module (e.g. in the form of a single chip) for building such a multi-LED driver circuit in a modular manner, for example by using three such modules and a small number of discrete components, e.g. at most two capacitors and three inductors and three LEDs.

It is an object of embodiments of the present invention to provide such a multi-LED driver circuit and/or such a module capable of driving said multiple LEDs with high efficiency, e.g. at least 85% or at least 90%, or at least 92%, or at least 94%.

It is an object of embodiments of the present invention to provide such a module in the form of a single chip (i.e. semiconductor die) which is more compact.

It is an object of embodiments of the present invention to provide such a module implemented in standard CMOS technology (for example 0.18 micron).

It is an object of embodiments of the present invention to provide such a module configured for being powered by a voltage in the range from about 5.0V to about 7.0V.

It is an object of embodiments of the present invention to provide such a system configured for being powered by a DC supply voltage in the range from about 7.5 V to about 10V, or from about 7.5V to about 24V, or from about 7.5V to about 50V, or from 7.5V to about 200V.

According to a first aspect, the present invention provides an electronic circuit comprising: an input capacitor connected between a first node and a second node; a first switch and a second switch connected in series between said first node and said second node, in parallel with said input capacitor, and defining an intermediate node at their interconnection; a voltage regulator configured for receiving power from said input capacitor and for providing output power at a configurable voltage between an output node and the second node; wherein the first and second switch is configured to be toggled at a frequency of at least 2 MHz, or at least 3 MHz, or at least 4 MHz, or at least 5 MHz, or at least 6 MHz, or at least 7 MHz, or at least 8 MHz, or at least 9 MHz, or at least 10 MHz.

It is an advantage of such a module that it can be used to build LED driver circuits in a variety of series and/or parallel configurations, with every individual LED being controllable to any power level.

It is a major advantage of this module that it allows easy implementation of "auto-balancing", and thereby enables cost-effective massive pixelation.

In an embodiment, the electronic circuit further comprising an output capacitor connected between the output node and the second node for stabilizing the output voltage.

In an embodiment, the electronic circuit further comprises a control unit configured for receiving a switch control signal via a fourth node, and for generating a first switch signal to control the first switch, and for generating a second switch signal to control the second switch.

In an embodiment, the control unit comprises a finite state machine and/or a level shifter.

In an embodiment, the electronic circuit further comprises a fifth node for passing the switch control signal or a signal derived therefrom to another electronic circuit.

In an embodiment, the control unit is further configured for receiving an output control signal via a fourth node and for providing this output control signal, or a signal derived therefrom to the voltage regulator to control the configurable voltage.

The control unit may comprise a serial interface for receiving said output control signal, and may comprise a PWM-generator for providing a pulse-width-modulated signal to the voltage regulator or a digital-to-analog converter for providing an analog voltage signal to the voltage regulator for controlling the output voltage to be generated.

In an embodiment, the electronic circuit further comprises a light emitting diode connected at the output of the voltage regulator.

It is an advantage that each LED is provided with its own driver, fully or almost fully integrated (apart from a small number of discrete components) in a standard low-voltage and low-cost IC process, e.g. standard CMOS process.

In an embodiment, the voltage regulator is a linear voltage regulator.

In an embodiment, the voltage regulator is a switched inductor converter (SIC).

In an embodiment, the voltage regulator is a resonant or a hybrid switched capacitor converter.

In an embodiment, the voltage regulator is a resonant switched capacitor converter or a hybrid switched capacitor converter comprising at least one capacitor and at least one inductor connected in series with said capacitor, wherein the capacitor has a value in the range from 400 pF to 1.4 nF; and wherein the inductor has a value in the range from 40 nH to 160 nH.

In an embodiment, the voltage regulator is a resonant switched capacitor converter or a hybrid switched capacitor converter comprising at least two switches, configured to switch at a frequency in the range from 20 MHz to 60 MHz.

According to a second aspect, the present invention also provides a system comprising: a first, second and third module according to the first aspect, wherein the first node of the second module is connected to the second node of the first module, and wherein the intermediate node of the second module is connected to the second node of the third module; and wherein the intermediate node of the first module is connected to the first node of the third module; and wherein the first and second switch of at least the first and second module is being toggled at a balancing frequency of at least 2 MHz, in such a way that: during a first moment in time, the first switch of the first and second module are configured to be closed while the second switch of the first and second module are configured to be open, and during a second moment in time, the first switch of the first and second module are configured to be open while the second switch of the first and second module are configured to be closed, thereby causing charge distribution between the input capacitor of the first, and second and third module.

This embodiment can be considered to be a "power distribution system" capable of providing power at three different voltages. When used for driving LEDs, this circuit can be considered to be a "multi-LED driver".

It is an advantage of this toggling of the switches, that a supply voltage, applied to the first node of the first module is substantially equally divided over the three modules. This technique is referred to herein as "auto-balancing", and is one of the underlying principles of the present invention.

It is an advantage that the toggling frequency is not critical, provided it is sufficiently large (e.g. at least 2 MHz).

It is a further advantage that the duty cycle of the signals provided to the switches does not have to be 50% either, but can for example be a value in the range from 10% to 40%.

In an embodiment, each module comprises a light emitting diode.

This embodiment is a "multi-LED system", for example, if the colours of the three LEDs are different, a tri-color LED system.

In preferred embodiments, this system is incorporated in a single package. The package may comprise three chips corresponding to the three modules, and only a small number of discrete components, for example two discrete capacitors (e.g. C1 and C2 in FIG. 1a) and optionally three inductors (e.g. Lx of FIG. 6 or Lx of FIG. 8).

It is an advantage of this system that the LED drivers are interconnected (e.g. stacked) in such a way that the available system supply voltage automatically distributes equally over all the modules or stacked chips or LEDs, even when LEDs of different type or manufacturer are used, and even in case the power per LED differs largely.

In an embodiment, the system further comprises at least three discrete light emitting diodes, each connected to an output (N6) of one module.

This embodiment is a "multi-LED system", for example, if the colour of the three LEDs are different, a tri-color LED system.

In an embodiment, the system further comprises a system controller configured for providing a switch control signal of at least 2 MHz to at least the first and the second module.

In an embodiment, the system controller is further configured for providing a first output control signal to the first module, and a second output control signal to the second module, and a third output control signal to the third module.

The output control signal may be a single digital bitstream, containing at least three digital values defining the output of the first, second and third module.

According to a third aspect, the present invention also provides a method of building a solid state light emitting device, comprising the steps of: a) providing at least a first, a second and a third module according to the first aspect; b) connecting the first node of the second module to the second node of the first module; c) connecting the intermediate node of the second module to the second node of the third module; d) connecting the intermediate node of the first module to the first node of the third module.

According to a fourth aspect, the present invention also provides a method of powering three light emitting diodes, using a system according to the second aspect, the method comprising the steps of a) providing a supply voltage over the first node of the first module, and the second node of the second module; b) toggling the first and second switch of at least the first and second module at a balancing frequency of at least 2 MHz, in such a way that: during a first moment in time, the first switch of the first and second module are configured to be closed while the second switch of the first and second module are configured to be open, and during a second moment in time, the first switch of the first and second module are configured to be open while the second switch of the first and second module are configured to be closed; thereby causing charge redistribution between the input capacitor of the first, second and third module.

The supply voltage (for a 3 module system) may be a voltage in the range from 6.0V to 10.0V.

According to a fifth aspect, the present invention also provides a display device comprising a plurality of pixels organized in rows and columns, the display device comprising a plurality of systems according to the second aspect, each system forming one pixel of said display device.

These and other aspects of the inventions will be apparent from and elucidated with reference to the embodiment(s) described hereinafter.

BRIEF DESCRIPTION OF THE DRAWINGS

FIG. 3(a) shows the voltages over the three input capacitors.

FIG. 3(b) shows control signals applied to the voltage balancing switches (swnH, swnL, n∈{1 . . . 3}).

FIG. 4(a) shows an electronic circuit or module according to an embodiment of the present invention, three of which are used in the multi-output power supply system of FIG. 1(a).

FIG. 4(b) shows a variant of the module of FIG. 4(a), further comprising a light emitting diode (LED), according to an embodiment of the present invention.

Figure 1A:
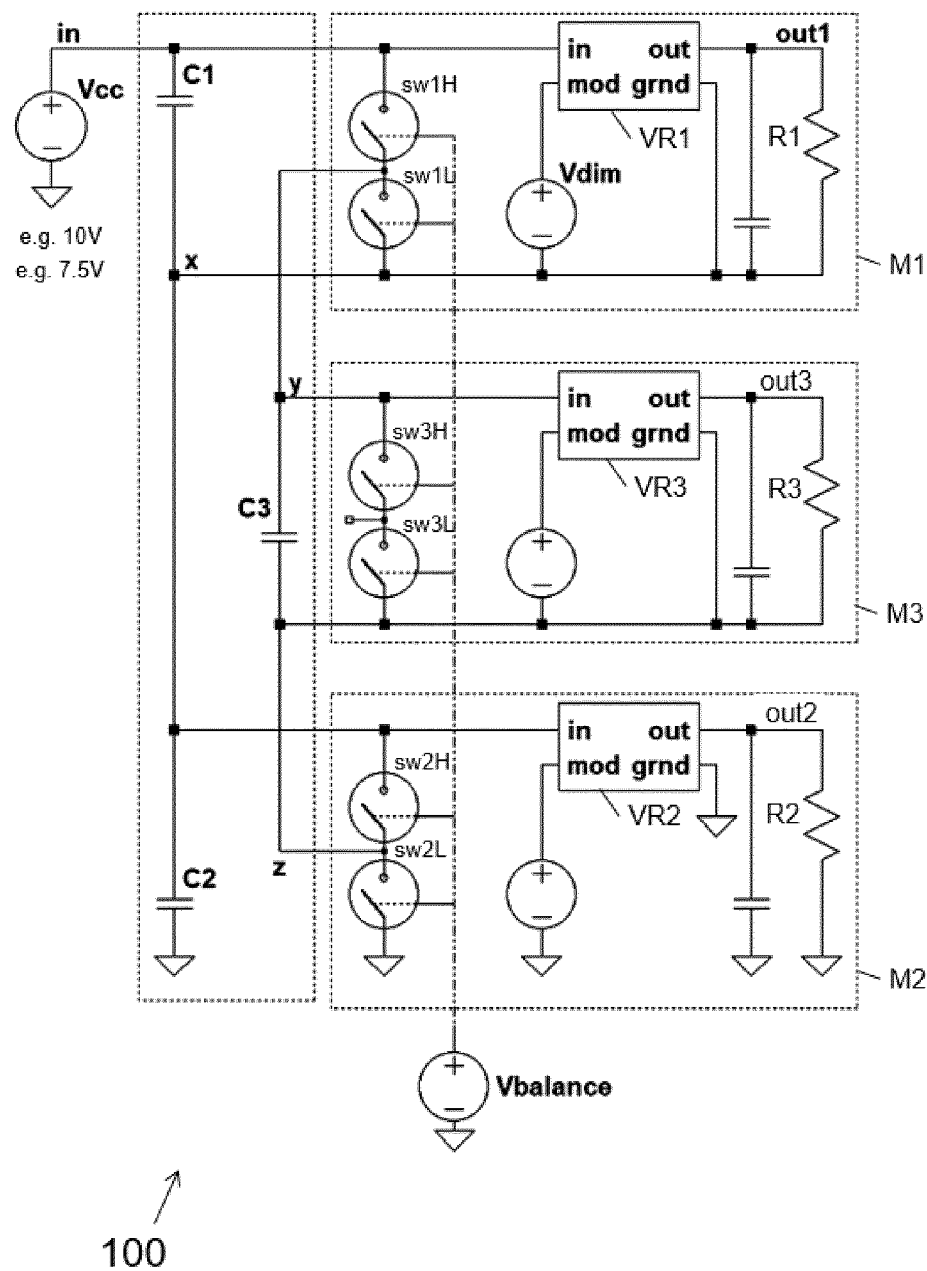
FIG. 1(a) shows an illustrative block diagram of a multi-output power supply system according to an embodiment of the present invention, having at least one "floating" output.

The drawings are only schematic and are non-limiting. In the drawings, the size of some of the elements may be exaggerated and not drawn on scale for illustrative purposes.

DETAILED DESCRIPTION

The present invention relates to DC-DC converter circuits, and more in particular to hybrid switched capacitor circuits capable of powering at least two or at least three electrical loads. It is a challenge to provide reliable circuits which are both compact and highly energy efficient.

The present invention also relates to LED driver circuits and multi-LED driver circuits, as an example of such circuits where the load is a light emitting diode (LED). The LEDs should be individually dimmable to allow generation of various colours.

As described in the background section, the PhD thesis [1] describes various circuits and sub-circuits which can be used in such modules or systems. In chapter 6 of this thesis multi-LED driver circuits are described, composed of multiple hybrid switched capacitor modules connected in parallel or in series. As stated in paragraph 6.3.2, the balancing of the different modules remains a technical challenge, which is not solved.

Figure 1B:
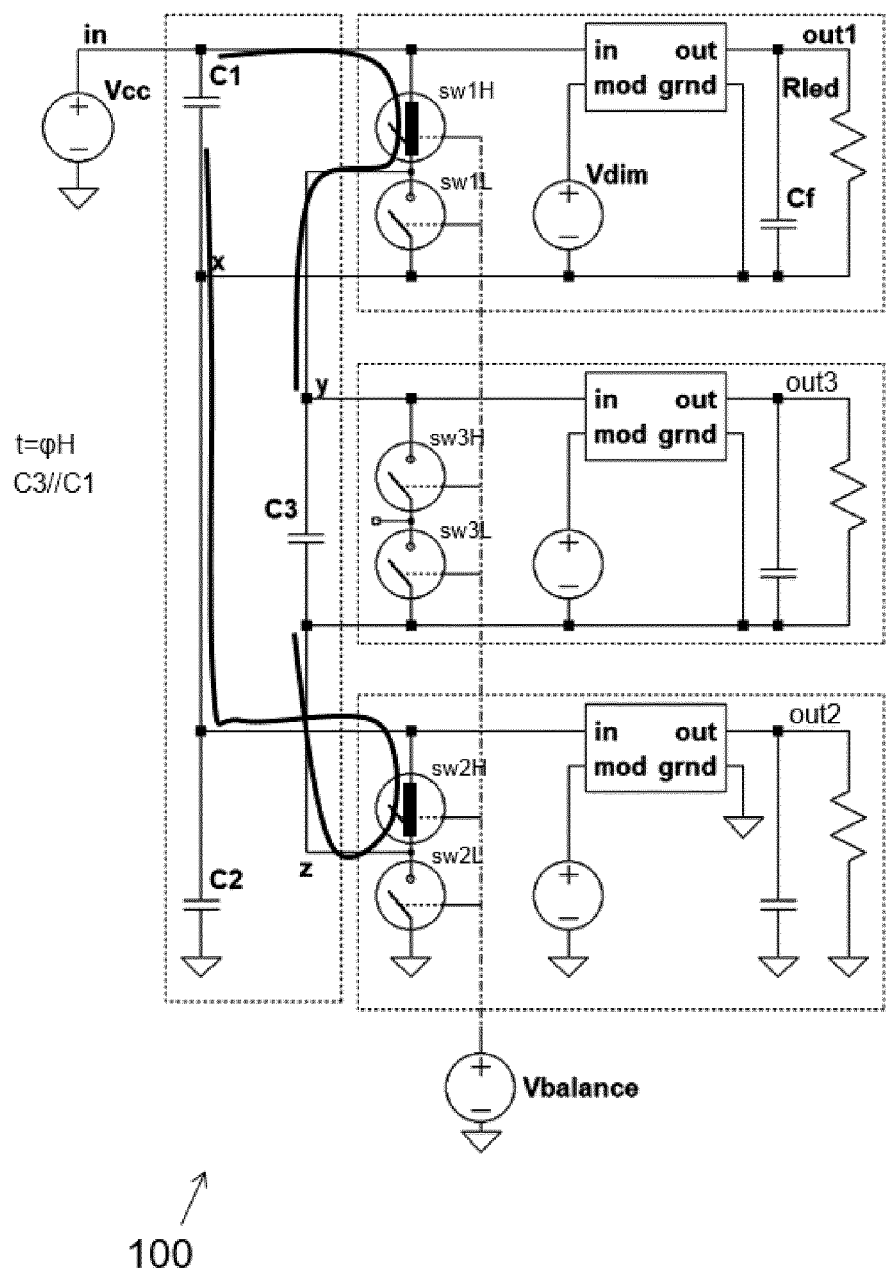
FIG. 1(b) illustrates charge distribution during a first phase.
Figure 1C:
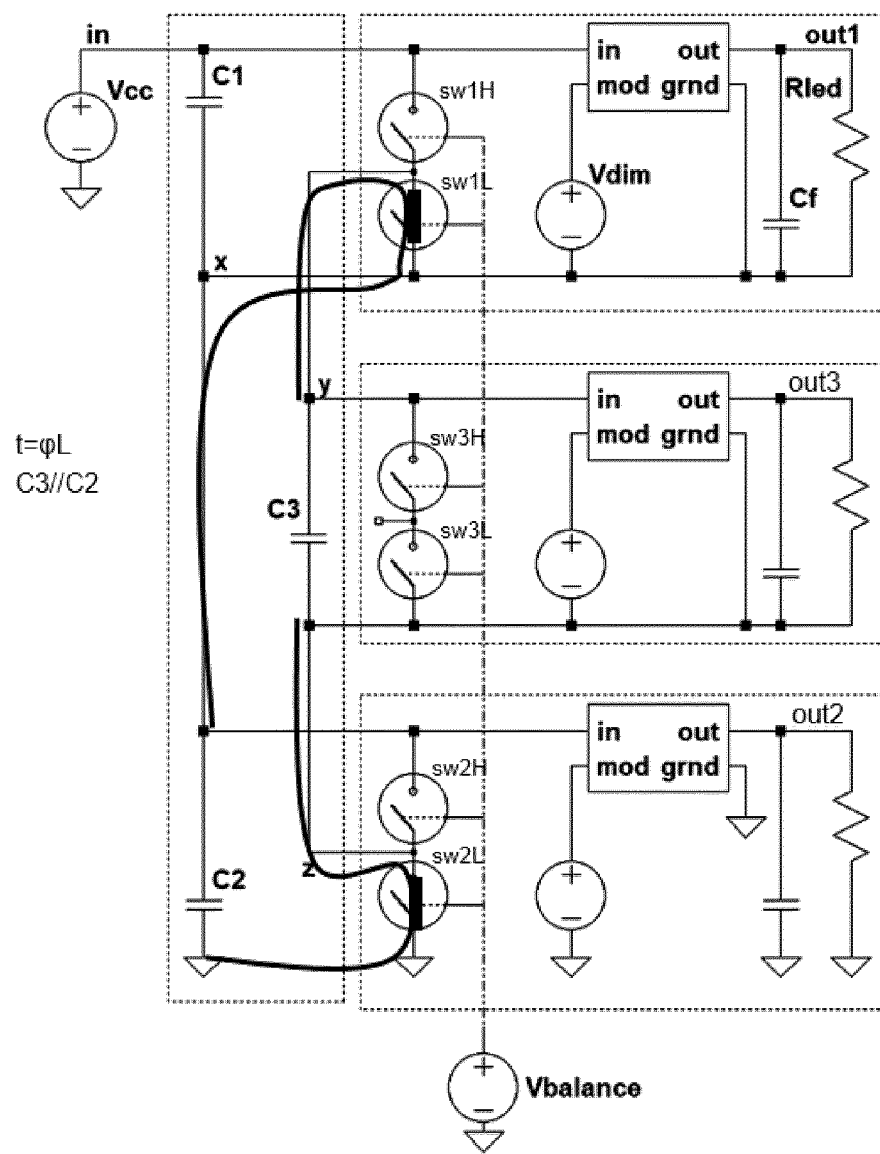
FIG. 1(c) illustrates charge distribution during a second phase.
Figure 2:
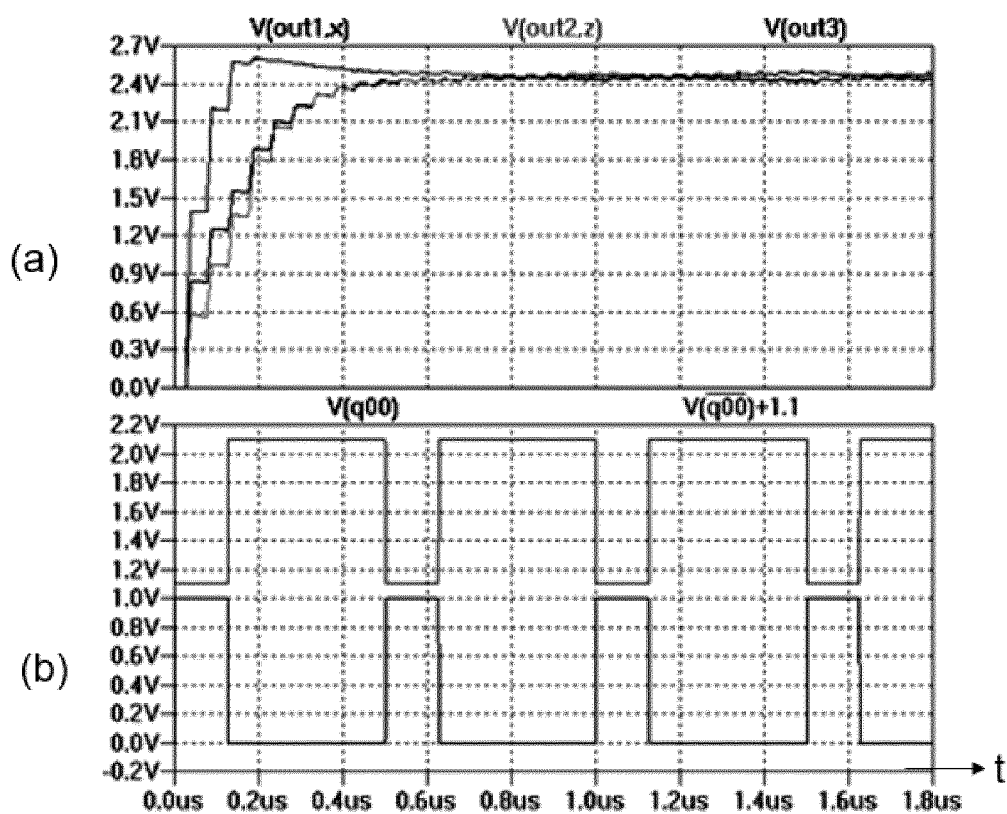
FIG. 2 shows simulation results of "voltage balancing" of the circuit of FIG. 1(a), for a first set of equal loads (5Ω//1 µF), when applying 7.5V supply voltage, using a toggle frequency of 20 MHz and a duty cycle of about 25%.
Figure 3:
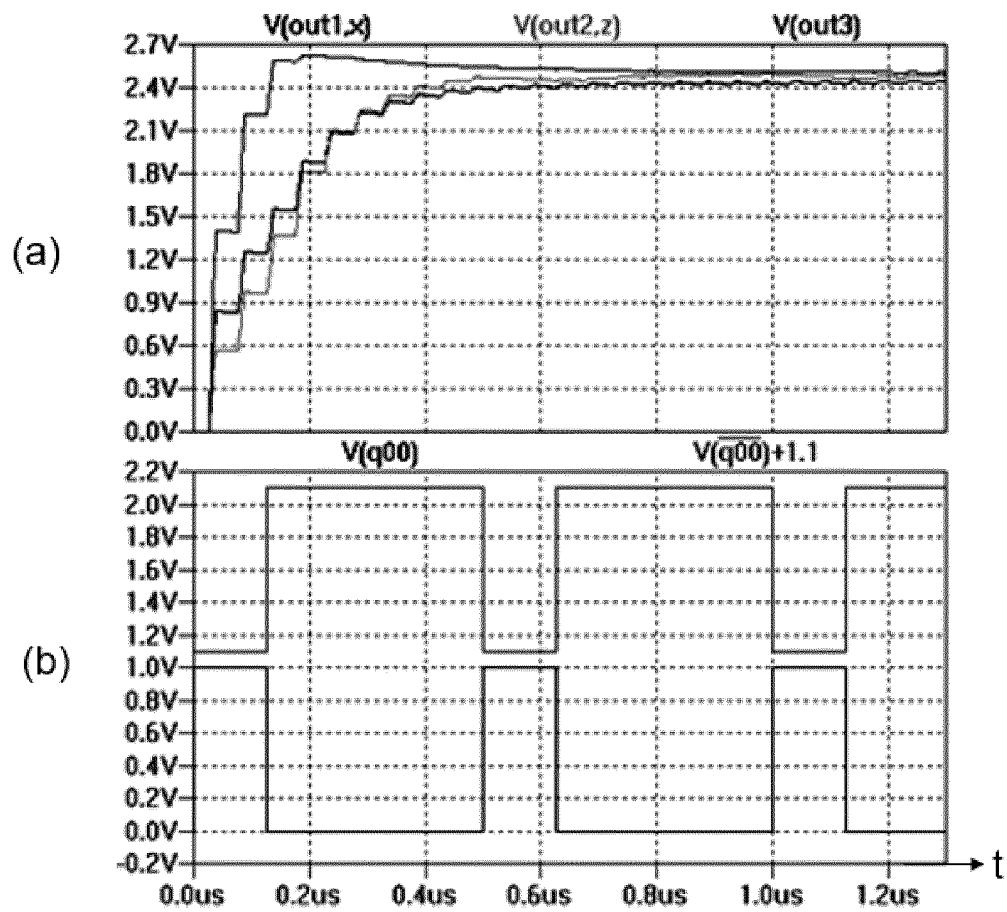
FIG. 3 shows simulation results of "voltage balancing" of the circuit of FIG. 1(a), for three different loads (load1=5Ω//1 µF, load2=10Ω//1 µF, and load3=15Ω//1 µF), when applying 7.5V supply voltage, using a toggle frequency of 2 MHz (10 times lower than the 20 MHz switching frequency of the modules) and a duty cycle of about 25%.

The present invention provides a solution to that problem, by providing an auto-balancing technique by using at least three modules having an input capacitor and a first pair of switches, as will be illustrated mainly in FIG. 1 to FIG. 3. The modules furthermore comprise a voltage regulator which is powered by the input capacitor. In principle any type of voltage regulator can be used.

FIG. 4 and FIG. 5 illustrate a modular approach, proposed by the present invention, which is surprisingly convenient for embodiments of the present invention. Moreover, such modular approach allows to reduce the design and test effort considerably.

Figure 6:
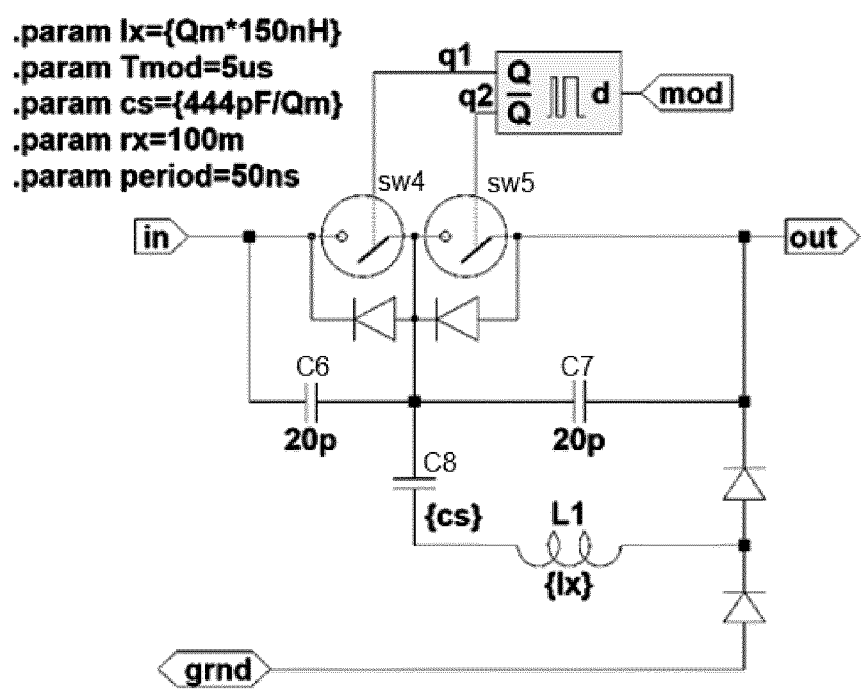
FIG. 6 shows a simplified circuit diagram of a proposed switched inductive voltage regulator circuit as can be used in the modules and the multi-output power supply systems of FIG. 1 to FIG. 5.
Figure 7:
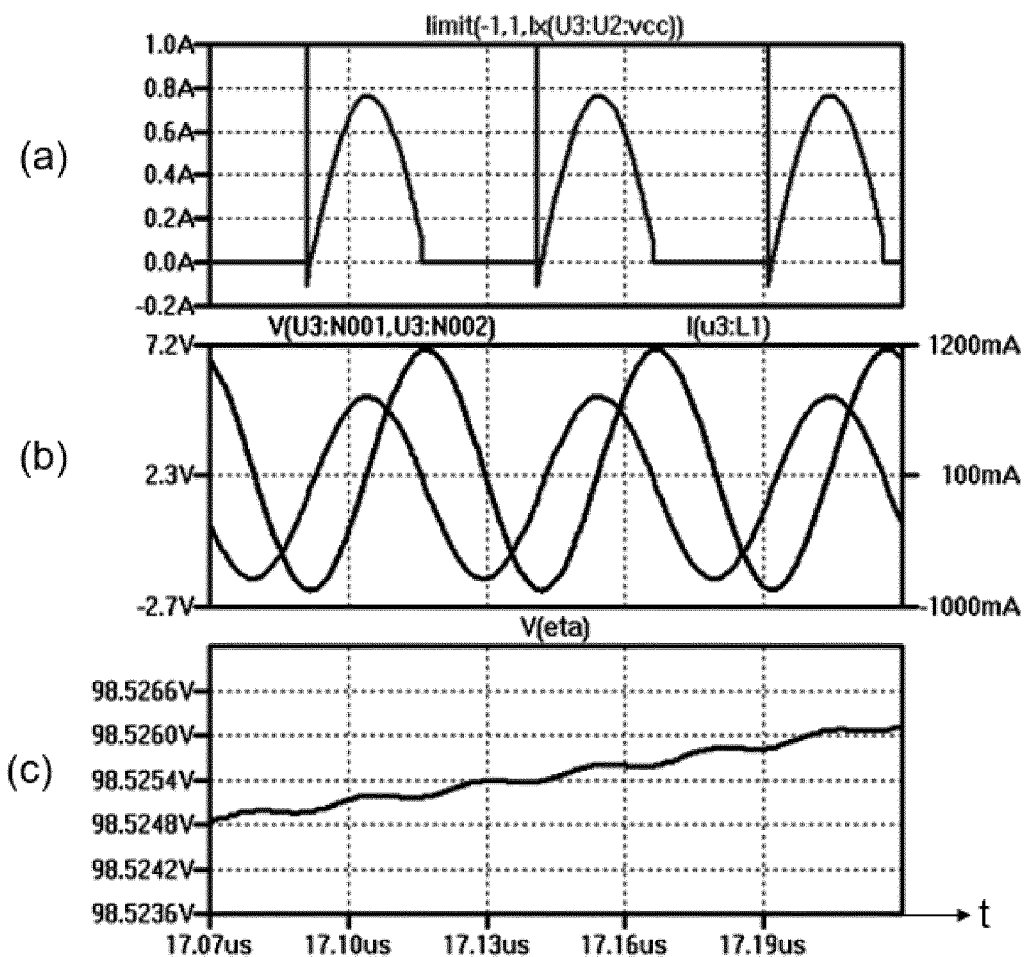
FIG. 7 shows simulation results for the circuit of FIG. 6.

In some embodiments of the present invention, the voltage regulator is a switched inductor circuit (SIC) containing a second pair of switches and a resonant circuit, as will be illustrated for example in FIG. 6 and FIG. 7. In this case, preferably zero-current-switching (ZCS) mode of operation is used. In Zero-Current Switching (ZCS), the switches are commutated at zero current. This soft-switching technique decreases the switching losses in the switches, and thus increases power efficiency.

Figure 8:
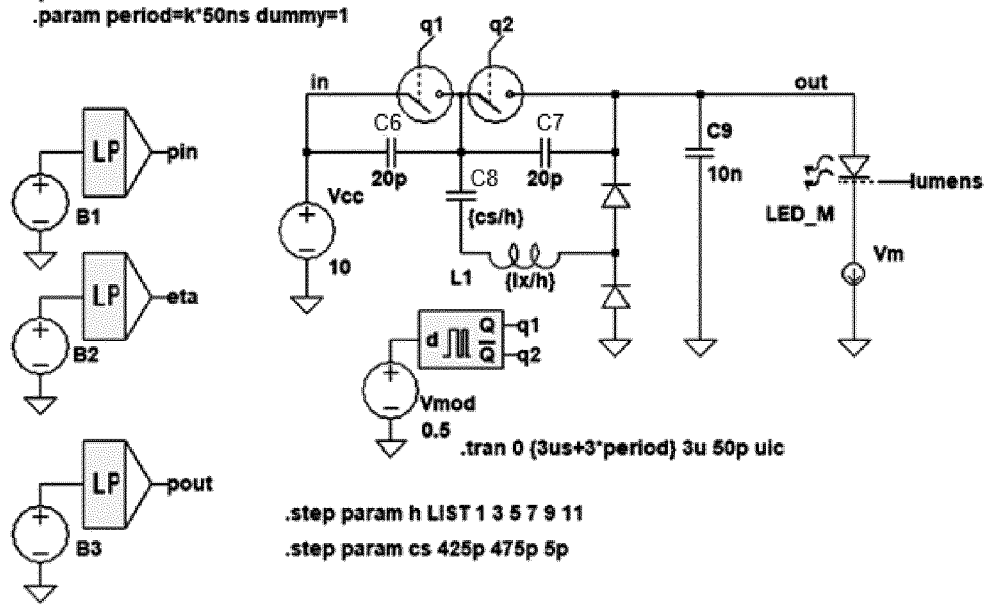
FIG. 8 shows a variant of the voltage regulator circuit illustrated in FIG. 6, where the tank is tuned to a higher harmonic resonant frequency.
Figure 9:
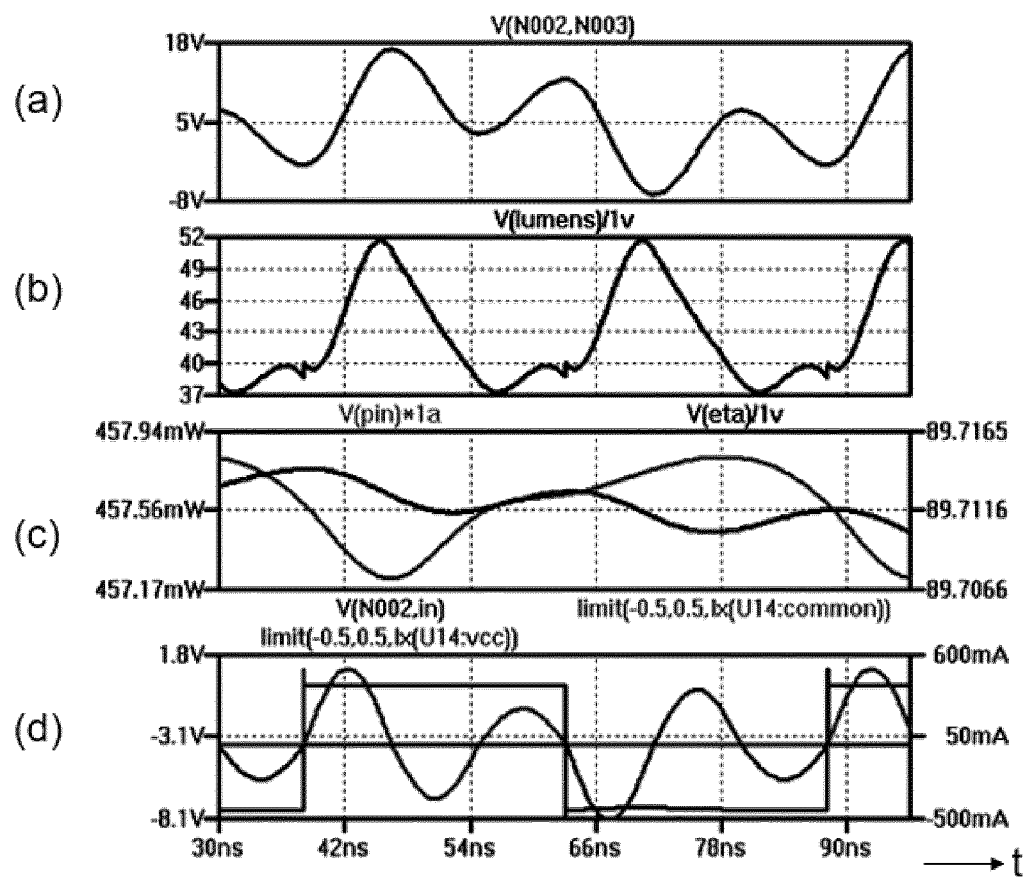
FIG. 9 shows simulation results for the circuit of FIG. 8.

The present invention also provides an embodiment where the voltage regulator inside the module is a switched inductor circuit (SIC) containing a resonant circuit configured to resonate at an integer multiple (e.g. M=3) of the switching frequency of the second pair of switches, as will be illustrated for example in FIG. 8 and FIG. 9.

Referring now to the Figures.

FIG. 1(a) shows a simplified block diagram of a stack or series connection of three modules M1, M2, M3 forming a multi-output power supply system 100.

In the example of FIG. 1(a), the stack contains three modules M1, M2, M3, suggested by the dotted lines, but the present invention is not limited to systems containing only three modules, and will also work for more than three modules. Each module Mi has a voltage regulator VRi. In the example of FIG. 1, each modules also contains a load as part of the module, but that is not absolutely required, and the load may also be external to the module. In the example of FIG. 1a, each load is a capacitor in parallel with a resistor, but the present invention is not limited thereto. In some embodiments of the present invention, the resistors are replaced by a light emitting diode (LED), as will be described further. The modules may be implemented as discrete 7V ICs, meaning, designed to be powered by a voltage of at most 7V.

The main purpose of FIG. 1(a) to FIG. 1(c) is to illustrate the principle of "load balancing" proposed by the present invention, which is achieved by adding three capacitors C1, C2, C3 and at least two pairs of switches in front of the voltage regulators, namely a first capacitor C1 and a first pair of switches sw1H, sw1L in front of the first voltage regulator VR1 of the first module M1; and a second capacitor C2 and a second pair of sw2H, sw2L in front of the second voltage regulator VR2 of the second module M2; and a third capacitor C3 in front of the third voltage regulator VR3 of the third module M3. It is noted that the third module M3 may also have a pair of switches sw3H, sw3L, but these are not used in practice, and may be omitted (e.g. in a dedicated implementation).

As can be seen in FIG. 1(a), the capacitors C1 and C2 of the first and second module M1, M2 are connected in series between the supply voltage VCC and ground GND, whereas the terminals of the capacitor C3 of the third module M3 are connected to a node "y" defined by the interconnection of the switches sw1H, sw1L of module M1, and a node "z" defined by the interconnection of the switches sw2H, sw2L of module M2.

According to an aspect of the present invention, balancing of the voltages over the capacitors C1, C2, C3 is obtained by toggling the switches of the first and second module M1, M2 at a frequency of at least 10 MHz, e.g. at a frequency in the range from 10 MHz to 20 MHz, e.g. at a frequency of about 11 MHz, or about 12 MHz, or about 13 MHz, or about 14 MHz, or about 15 MHz, or about 16 MHz, or about 17 MHz, or about 18 MHz, or about 19 MHz. The switches need to be toggled in such a way that:

i) during a first time period (or phase), the high-side switches sw1H, sw2H of the first and second module M1, 2 are closed while the low-side switches sw1L, sw2L are open, as illustrated in FIG. 1(b). As can be seen, in this configuration the capacitor C3 of the third module M3 is connected in parallel to the capacitor C1.

ii) during a second time period (or phase), the high-side switches sw1H, sw2H of the first and second module M1, 2 are open while the low-side switches sw1L, sw2L are closed, as illustrated in FIG. 1(c). As can be seen, in this configuration the capacitor C3 of the third module M3 is connected in parallel to the capacitor C2.

This toggling causes charge redistribution between the three capacitors C1, C2, C3 in such a way that the voltage over each of these capacitors is substantially equal, provided that the capacitor value of C1, C2 and C3 are equal. Preferably the toggling frequency of the input capacitors is sufficiently high (e.g. at least 2 MHz, or at least 5 MHz, or at least 10 MHz) to limit or reduce losses caused by relatively large voltage imbalances.

Thus, as an example, if the supply voltage Vcc is equal to 10V, the balancing scheme ensures that the voltage over C1, C2 and C3 is substantially equal to 10V/2=5V. As another example, if the supply voltage Vcc is equal to 7.5V, the balancing scheme ensures that the voltage over C1, C2 and C3 is substantially equal to 7.5V/2=3.75V.

This can be understood as follows: the module M1 generating "out1" presents an effective impedance "r1" across the nodes "in" and "x", and is connected in series with the module M2 generating "out2", which itself presents an effective impedance "r2 across node "z" and ground. The voltage across the capacitors C1 and C2 therefore stabilizes at Vcc·r2/(r1+r2). When controlling the power on "out1" and "out3" to arbitrary values, the effective impedances "r1" and "r2" will not be equal, and the voltage on node "x" will differ from the desired 5V (50% of the 10V supply voltage) that is needed for correct independent operation. By adding the third module M3, fed from the capacitor C3, and by connecting C3 rapidly back and forth between the nodes (in, x) and (x, ground), the voltage on C3 is forced to be equal to the voltage on C1, then to the voltage on C2, then to the voltage on C1, etc. In the end, the three voltages have to be equal. Since the sum of the voltages across C1 and C2 is equal to the supply voltage Vcc, e.g. 10V in the example, in steady-state the voltage over the three modules M1, M2, M3 stabilizes to approximately 5V. By choosing a sufficiently high toggling frequency (e.g. at least 10 MHz) and by choosing capacitor impedances sufficiently low relative to r1 and r2, it can be ensured that the capacitors do not discharge significantly between two toggling phases. It is noted that, the lower the voltage imbalance, the lower the energy lost in the capacitive charge/discharge process.

For completeness, it can be seen that the switches sw3H and sw3L of the third module M3 could be omitted, but in a modular approach, these switches would be present in every module. In an embodiment, the switches sw3H, sw3L could both remain open at all times (which may reduce switching losses), but since the intermediate node of the third module M3 is not connected to any of the capacitors C1, C2, C3, the switches sw3H, sw3L may also be toggled along with the switches of the other modules.

FIG. 2 shows simulation results of "voltage balancing" of the circuit of FIG. 1(a), for a first set of equal loads (5Ω//1 μF), when applying 7.5V supply voltage, using a toggle frequency of the switches sw1H, sw1L, sw2H, sw1L of 2 MHz and a duty cycle of about 25%. The input capacitors C1, C2 and C3 are 1 μF. FIG. 2(a) shows the voltages over the three input capacitors. FIG. 2(b) shows control signals applied to the toggle switches. In this simulation the voltage regulator blocks are switching at 20 MHz, as evidenced by the ripple on the output voltages.

As can be seen in FIG. 2, the voltage balancing works surprisingly well. The three output voltages (here chosen to be substantially equal to 2.5V) are balanced within approximately 800 ns to their nominal value. The maximum steady state error between the outputs is about 45 mV.

FIG. 3 shows simulation results of "voltage balancing" of the circuit of FIG. 1(a), for three different loads (load1=5Ω//1 μF, load2=10Ω//1 μF, and load3=15Ω//1 μF), when applying 7.5V supply voltage, using a toggle frequency of the switches sw1H, sw1L, sw2H, sw1L of 2 MHz and a duty cycle of about 25%. The input capacitors C1, C2 and C3 are 1 μF. FIG. 3(a) shows the voltages over the three input capacitors. FIG. 3(b) shows control signals applied to the switches.

As can be seen from FIG. 3, the voltage balancing still works surprisingly well, even for a 3 to 1 load unbalance. The three output voltages (again chosen to be substantially equal to 2.5V) are again balanced within approximately 800 ns to their nominal values. In this example, the final uncorrected voltage error is about 90 mV. This error can be reduced by choosing bigger input capacitors C1, C2, C3 and/or by increasing the toggling frequency.

As connecting capacitors in parallel (known as "paralleling capacitors") causes a nearly instantaneous charge equalization, the duty cycle of the toggling signal need not be 50%. In practice the time constant of the ON-resistance of the switch and the total capacitance determines the length of the minimum charging interval. Somewhat surprisingly a duty cycle of about 10% appears to substantially minimize the output voltage differences. It was found that the output voltages difference for a duty cycle of 25% are negligible.

From the above, it can be understood that the "auto-balancing principle" allows interconnecting modules (e.g. chips) in such a way that the available system supply voltage automatically distributes evenly over all the modules (e.g. stacked chips) for powering various loads, e.g. LEDs, even when LEDs of different type or manufacture are used and/or when the power per LED differs greatly. But the present invention is not limited to LEDs, and other loads, such as e.g. sensors or detectors or transducers can also be used.

Preferably the modules are manufactured in a low voltage process, e.g. a 7V process. The proposal of FIG. 1 also makes it possible that the modules (e.g. stacked chips) directly communicate over a wired bus, e.g. a serial bus, manufactured in the same 7V process.

Figure 4C:
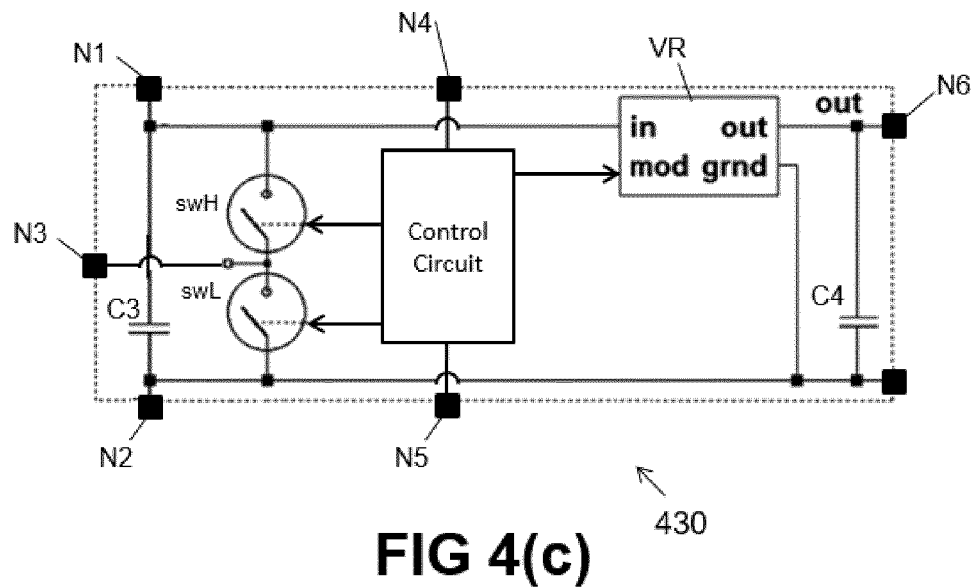
FIG. 4(c) shows a variant of the module shown in FIG. 4(a), further comprising a control circuit, according to an embodiment of the present invention.
Figure 4D:
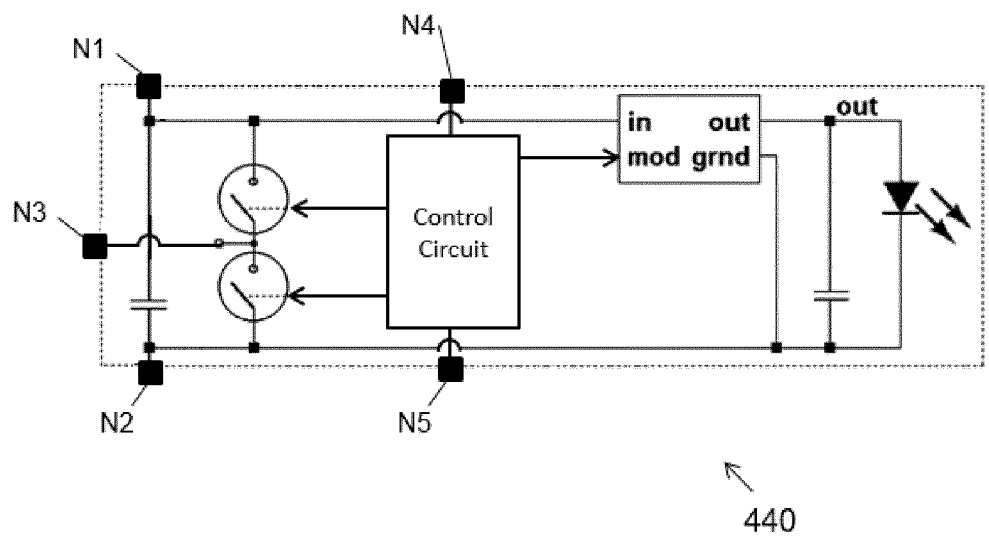
FIG. 4(d) shows a variant of the module of FIG. 4(c), further comprising a light emitting diode (LED), according to an embodiment of the present invention.
Figure 5A:
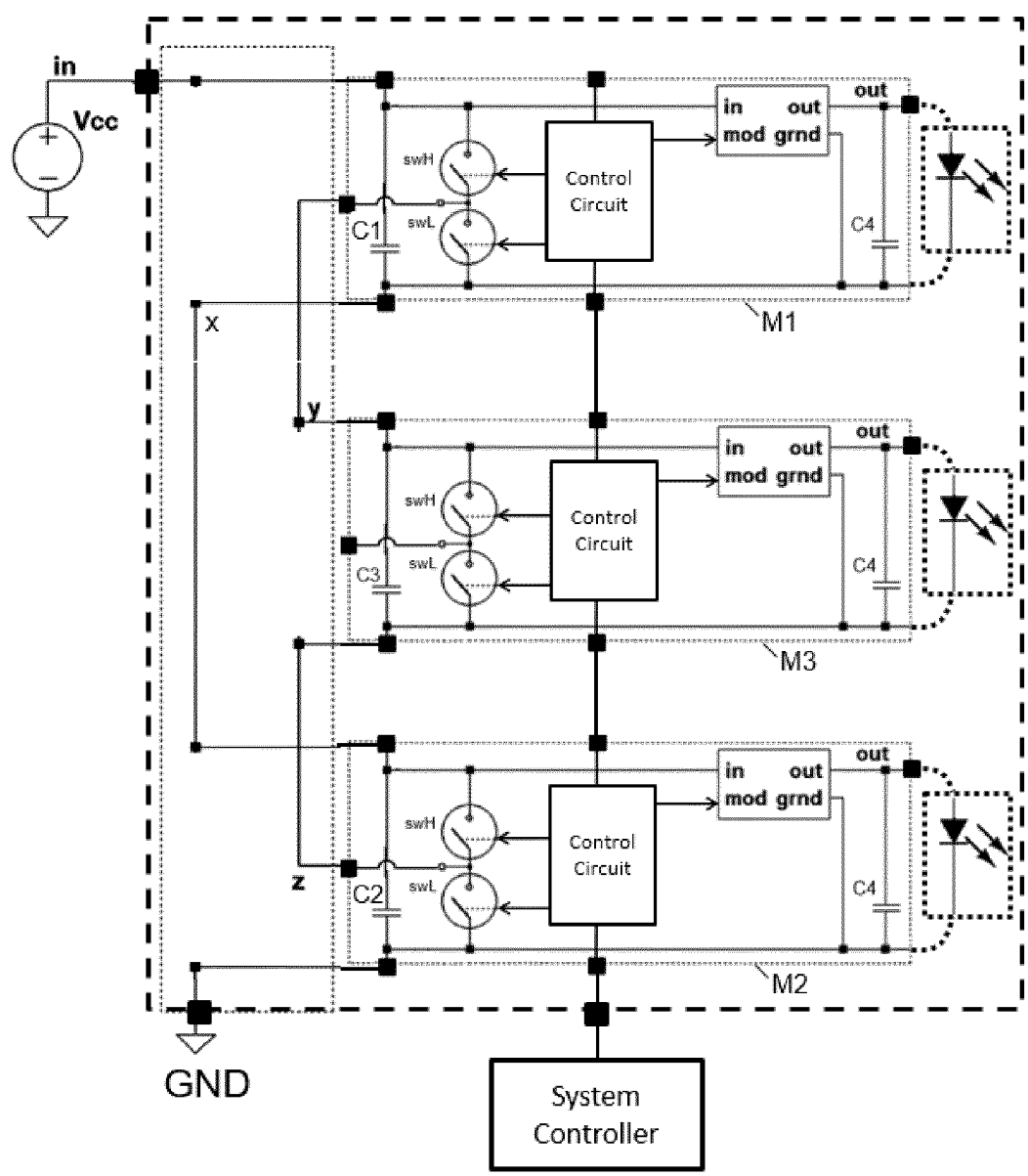
FIG. 5(a) shows a block-diagram of a multi-LED driver circuit according to an embodiment of the present invention, comprising three modules as shown in FIG. 4(b), each connected to a LED.
Figure 5B:
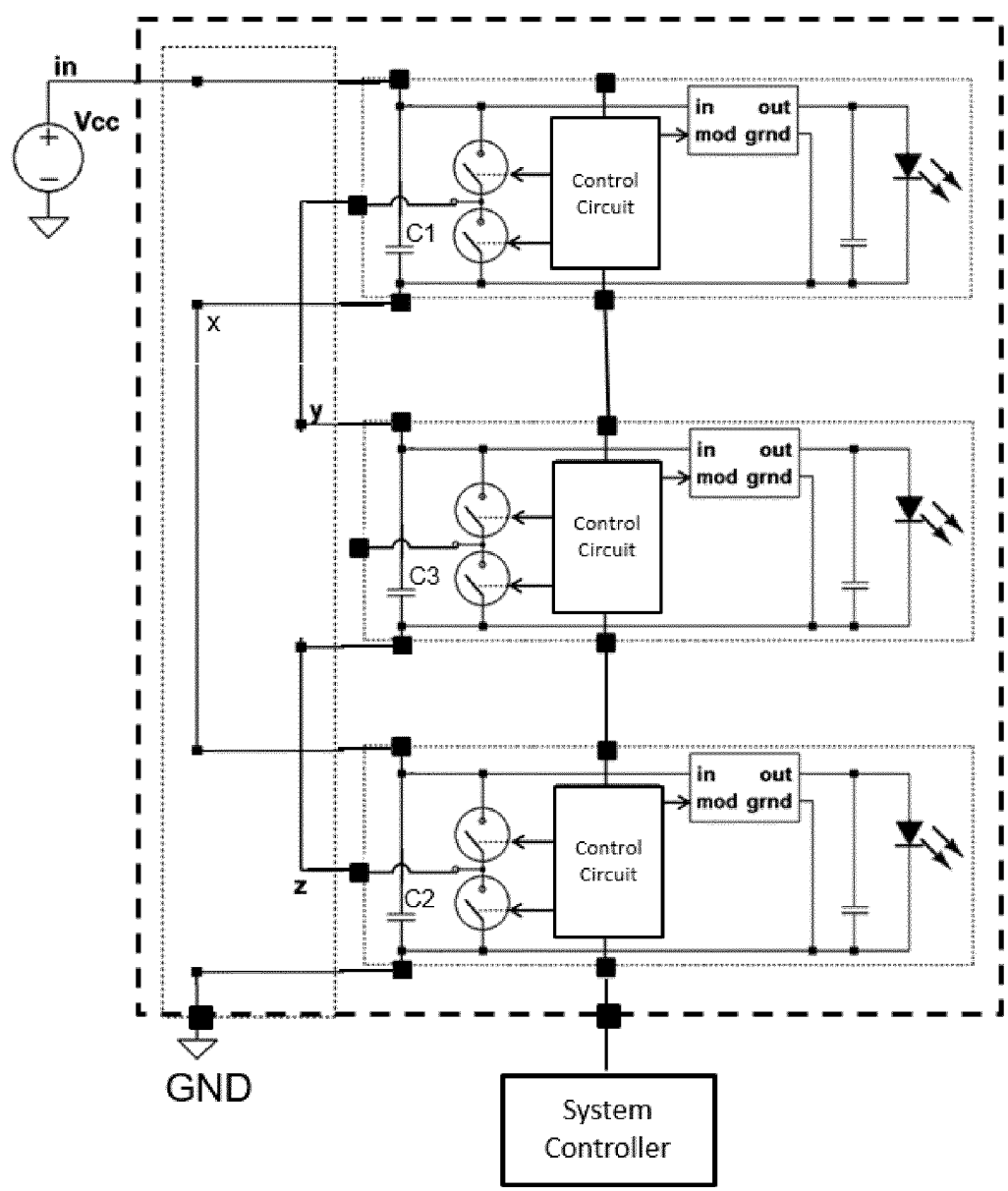
FIG. 5(b) shows a block-diagram of a multi-LED driver circuit according to an embodiment of the present invention, comprising three modules as shown in FIG. 4(d).

Referring back to FIG. 1(a), it can be understood that the balancing scheme will work for various kinds of voltage regulators VR. In embodiments of the present invention, the modules M1, M2, M3 comprise a linear voltage regulator, or a switched capacitor circuit (SCC), or a switched inductive circuit (SIC), or any other suitable voltage regulator. Depending on the voltage regulator type, a different control signal will be applied to the control port "mod" of the voltage regulator. In the example of FIG. 1(a) this control signal is represented as a DC voltage, as can for example be generated by a (local) digital-to-analog-convertor (DAC, not shown), but the present invention is not limited thereto, and other control signals for controlling the voltage regulator for adjusting the output voltage can also be used, for example a pulse-width modulated (PWM) signal (not shown). Such an analog voltage or a PWM signal may for example be generated by a control circuit as shown in FIG. 4(c) or FIG. 4(d). The control signal may be an analog circuit, or a digital circuit, or a hybrid circuit (with an analog portion and a digital portion), and may contain for example a finite state machine (FSM), etc. The actual "setting" or "configuration" or "command" of the output powers (or output voltages) of each of the modules may come e.g. from a system controller external to the multi-power supply system, for example as illustrated in FIG. 5(a) or FIG. 5(b).

Referring back to FIG. 1(a) once more, it can be understood that the switches sw1H, sw1L of the first module M1, and the switches sw2H, sw2L of the second module M2 need to be toggled synchronously. This can be achieved for example by providing a switch control signal (e.g. by the system controller mentioned above) to the second module M2, which signal is locally converted into two complementary signals for controlling the local switches, and which signal is daisy chained towards the first module M1, optionally via the third module M3.

In the embodiment shown in FIG. 1, a single control line is daisy-chained from module to module (e.g. from chip to chip). This line may (digitally) communicate a different value to each module. Alternatively, this line may provide a synchronous charge balancing signal toggling at a frequency below 25 MHz, e.g. in the range from 2 MHz to 20 MHz, or in the range from 10 MHz to 20 MHz.

Next, the modularity of the system of FIG. 1(a) will be described in more detail.

As already suggested above, the multi-power supply system of FIG. 1(a), or variants thereof, e.g. as shown in FIG. 5(a) and FIG. 5(b), can be build using a plurality of at least three identical modules M1, M2, M3. While the block-diagram of FIG. 1(a) suggests that the capacitors C1, C2, C3 are located outside of the modules M1, M2, M3, the inventors realized that in fact, the capacitors can actually be incorporated in the module itself. This offers an important advantage, because in this way the number of discrete components can be reduced.

Figure 4A:
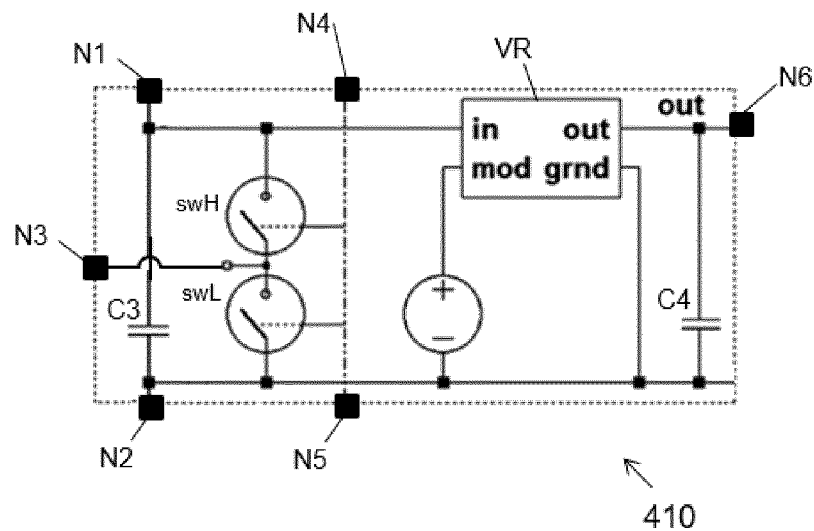
FIG. 4(a) shows the voltages over the three input capacitors.

FIG. 4(a) shows a block-diagram of an exemplary "building block" or "module" proposed by the present invention. This module is preferably implemented as a single chip, with as few external components as possible. The module 410 comprises:
 a first node N1;
 a second node N2;
 an input capacitor C3 connected between node N1 and N2;
 a high-side switch swH and a low-side switch swL, connected in series between node N1 and N2, and defining an intermediate node N3 between the two switches;
 a voltage regulator VR having an input port connected to node N1, a sink (or ground) port connected to node N2, a power output port "out" (node N6), and a control input "mod";
 optionally an output capacitor C4 connected between the output of the voltage regulator VR and node N2. It is noted that this output capacitor may be omitted, depending on the load that will be connected to the voltage regulator VR;
 a control voltage generator (schematically indicated by the circle with a plus and minus sign) located inside the module, for controlling the voltage regulator VR of this particular module. The control voltage generator can for example comprise a digital-to-analog-convertor (not explicitly shown) connected to control logic (not shown). The signal to be generated by this control voltage generator can for example be set by an external processor (not shown);

As already mentioned above, in principle, any type of voltage regulator can be used, for example a linear regulator, or a switched inductive circuit (SIC), or a switched capacitor circuit (SCC). A linear regulator offers the advantage that it can be fully integrated on a semiconductor die (no external components), and that its output voltage can be easily controlled by means of an analog voltage, but has the disadvantage that the power efficiency is not optimal. The same advantages and disadvantages also apply for a switched capacitor circuit (SCC). In a preferred embodiment, however, the voltage regulator is a switched inductive circuit (SIC) with a relatively small inductance. A particular example will be described in more detail in FIG. 6.

The switches swH and swL are controlled by one or two control lines, not shown in detail, but schematically illustrated by a dotted line running between node N4 and N5. The individual control signals for each switch are preferably generated inside the module in manners known per se in the art, on the basis of a switch-control-signal which is daisy-chained between the different modules.

Figure 4B:
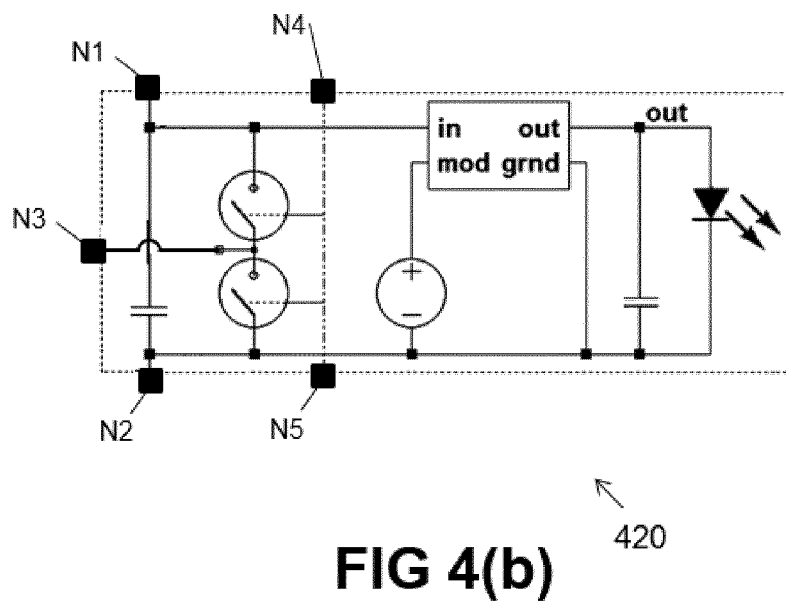
FIG. 4(b) shows control signals applied to the switches.

FIG. 4(b) shows a block-diagram of a module 420 similar to the module 410 of FIG. 4(a), furthermore including a light emitting diode LED, preferably integrated in the module, or connected (e.g. soldered) to the module.

FIG. 4(c) shows a block-diagram of a module 430, which can be considered a variant of the module 410 of FIG. 4(a), furthermore comprising a control circuit (e.g. an analog or digital or mixed analog and digital circuit) configured for receiving the above described "switch control signal" and/or the above described "output control signal", and configured for providing a first signal to the high-side switch swH, a second signal to the low-side switch swL, a third signal to the voltage regulator, and a fourth signal to the node N4.

FIG. 4(d) shows a block-diagram of a module 440 similar to the module 430 of FIG. 4(c), furthermore including a light emitting diode LED, preferably integrated in the module in the form of a semiconductor die, or connected (e.g. soldered) to the module.

FIG. 5(a) shows a block-diagram of a multi-LED driver circuit 510, comprising three modules as shown in FIG. 4(b), each module arranged for being connected to a corresponding LED. If the LEDs are present, the circuit of FIG. 5(a) inside the dashed rectangle shows a solid state lighting device, or a multi-LED system 510, e.g. a tri-color LED system. As can be seen, the input capacitor of the first module M1 is labelled "C1", and the input capacitor of the second module M2 is labelled "C2".

In an embodiment, the multi-LED system 510 comprises three modules M1, M2, M3 fully integrated on a single semiconductor die (thus one single die comprising the three modules), the semiconductor die being connected to three discrete LEDs. The semiconductor die and the three LEDs being interconnected and being packaged into a single package (i.e. packaged component). As shown, this multi-LED system can be easily connected to a voltage supply VCC and a system controller, external to the multi-LED system. In such a system, the light output (intensity) and color can be set by the external system controller.

In a variant, the three modules are almost completely integrated on a single semiconductor die, except for three inductors. These inductors may be implemented as discrete components, or as conductive tracks (e.g. copper tracks) on a substrate (e.g. a printed circuit board) electrically connected to the single semiconductor die. The substrate with the inductors or with the inductive tracks may be packaged into a single package (i.e. packaged component).

FIG. 5(b) shows a block-diagram of a multi-LED system according to an embodiment of the present invention, comprising three modules as shown in FIG. 4(d). This system is a variant of the system shown in FIG. 5(a) where the LEDs are integrated in the module, e.g. implemented on the respective semiconductor die as the rest of the module.

In an embodiment, the multi-LED system 520 comprises three modules M1, M2, M3 fully integrated on a single semiconductor die (thus one single die comprising the three modules). As shown, this multi-LED system can be easily connected to a voltage supply VCC and a system controller, external to the multi-LED system.

In a variant, the three modules are almost completely integrated on a single semiconductor die, except for three inductors. These inductors may be implemented as discrete components, or as conductive tracks (e.g. copper tracks) on a substrate (e.g. a printed circuit board) electrically connected to the single semiconductor die.

Thus FIG. 5(b) illustrates a fully integrated on-chip or in-package LED driver using the H-SCC approach with integrated inductor and capacitors ("integrated" meaning: embedded in the semiconductor substrate, or encapsulated in the package).

FIG. 6 shows a simplified circuit diagram of a proposed switched inductive voltage regulator circuit as can be used in the systems described above. For clarity, the auto-balancing switches are not shown. It is noted that in a practical realisation, diodes can be implemented using transistors, a detail not shown here.

The capacitor C8 and the inductor L1 connected in series with C8 form a tank. The quality factor Qm of the tank can be chosen (during design) to be a value in the range from about 0.33 to about 1.0. Depending on the quality factor Qm, the values of the other components can be determined, for example as indicated in FIG. 6.

The circuit of FIG. 6 is a resonant switched capacitor circuit (ReSC) resembling the one proposed in [1], on page 60, FIG. 4.1, but uses zero current switching (ZCS) of the switches sw4 and sw5 at approximately the resonance frequency of the tank. The switch duty-cycle is kept constant. It is noted that the PWM circuit in this simulation was used to find an optimal value w.r.t. circuit tolerances, but it can also be used as an "analog" controller.

The driver of FIG. 6 internally uses auto-synchronized zero-current-switching at more than 25 MHz. If this driver is used in module #i of a system, the output #i of that system can be controlled by turning the converter either fully ON or OFF for an integer number Ni of clock cycles.

As the switching frequency of the switches sw4, sw5 in this example is set to a frequency of about 25 MHz, very high resolution dimming is possible by turning individual LEDs fully ON or OFF for integer numbers of switching cycles. This has the added advantages that the efficiency of the driver is optimal over the full power range, and that an easy realization is possible even for much higher switching frequencies (e.g. up to 100 MHz). In addition to the on/off scheme, the LEDs can be fine-tuned in an analog fashion over a limited range by altering the switching frequency. This will not decrease the power efficiency when the switches are driven in discontinuous ZCS mode, i.e. when the switching frequency is kept below the resonance frequency of the tank.

For completeness, it is noted that the circuit shown in FIG. 6 differs mainly from the topology of the circuit in the thesis (FIG. 4.1) in that the inductor is in series with the load, not with the capacitor. Also, in the thesis a complicated form of PWM is used to regulate the LED current, while in the circuit of FIG. 6 of the present invention, the voltage converter is always in ZCS, slightly in discontinuous mode (i.e. $f_{sw}$ less than the resonant tank frequency) to decrease the inductor size further, and to be less dependent on component tolerances. Furthermore, in FIG. 6, the output is preferably controlled by turning the converter fully ON for a number of cycles, then OFF for another number of cycles ("subharmonic PWM"). It is an advantage of working in discontinuous mode, and using on-off control mode rather than trying to regulate the current each cycle (which is more complicated).

FIG. 7 shows a simulation of a tank current (i.e. the current flowing through the inductance Lx of FIG. 6), and the voltage of the proposed switched inductive circuit of FIG. 6. The top trace of FIG. 7(a) shows an exemplary waveform of the current flowing through the switches. The bottom trace of FIG. 7(c) indicates that the expected efficiency is about 98.5%, assuming 100 mΩ switches. This is a big advantage of this circuit. The trace of FIG. 7(b) shows the voltage over the capacitor C8 and the current flowing through the inductor Lx as a function of time. As can be seen, the peak-to-peak voltage over the capacitor C8 is about 9V, and the current has a magnitude of about 1200 mA.

This mode of operation allows to fine-tune or adjust the output voltage by means of the switching frequency instead of the duty-cycle. In case the load is a LED, only very small voltage and therefore frequency changes are necessary, because of the exponential behaviour of current flowing through the LED versus voltage over the LED. For larger output power variations, it is proposed to turn OFF the voltage regulator circuit for an integer number of switching cycles, e.g. by providing a logical '0' to the gate of both switches sw4 and sw5, to open both switches.

Apart from the high energy efficiency of this scheme, another big advantage of the voltage regulator of FIG. 6 is that the on-chip resonant capacitor Cs is only 444 pF (for a resonance frequency of 20 MHz and Qm=1) instead of 7.75 nF needed in the prior art circuit (at 18 MHz), resulting in 17 times less chip area (e.g. requiring only about 0.2 mm², assuming a technology offering 2.2 fF/μm²). Instead of the Lx=220 nH external inductor needed in the prior art circuit [1], the circuit proposed herein only needs an inductor of Lx=150 nH. Such an inductor can be implemented as a discrete inductor (external to the semiconductor die), or internal (e.g. using the parasitic bond wire inductance) or as copper track in the form of a loop (also external to the semiconductor die), or in any other suitable way.

It is noted that running with Qm=1 means that the voltage on the internal capacitor Cs can become 24Vpp (peak-to-peak). If Qm is chosen equal to 0.33, the peak-to-peak voltage over the internal capacitor Cs can be reduced to 7 Vpp, at the cost of a three times bigger capacitance Cs=1.35 nF, (requiring about 0.6 mm²) but with the advantage of a three times smaller inductance Lx=50 nH (smaller internal or external component).

But of course, the present invention is not limited to Qm-values equal to 0.33 or equal to 1.0, but the skilled person can choose other values of Qm in the range from 0.33 to 1.0.

Such a voltage regulator in the form of a resonant switched capacitor circuit (ReSC) can for example be implemented as a single-chip in CMOS technology, requiring only one external component, namely the inductor Lx, having a value in the range from about 50 nH to about 150 nH. But as already mentioned above, depending on technology, an internal bond wire inductance may replace the external inductor, thereby reducing the number of external components.

FIG. 8 shows a variant of the voltage regulator circuit illustrated in FIG. 6, where the tank is tuned to a higher harmonic frequency, for example to the third harmonic frequency (M=3). With M=3 both the capacitor Cs and the inductor Lx become three times smaller, respectively Cs=150 pF and Lx=50 nH. However, the voltage over Cs would become 27 Vpp, and may become even higher when the peak current is increased to compensate for the lower output power. Importantly, the decreased tank component values make a very small and cost effective IC possible. The downside is that the switch current needs to be higher for the same output power.

Such a voltage regulator in the form of a resonant switched capacitor circuit (ReSC) operating at the 3rd harmonic, may be implemented in CMOS technology or in GaN technology, requiring only one external component, namely the inductor Lx, having a value of about 40 to 60 nH, e.g. equal to about 50 nH. Again, depending on technology, an internal bond wire inductance may replace this external inductor.

A small disadvantage of the on-off control mode is a higher current ripple, resulting in larger output capacitors of about 100 nF, but this is still much smaller than the output capacitor of 10 μF, used in [1].

It is noted that the output of the resonant circuit of FIG. 6 and FIG. 8 can be turned completely ON (by toggling the switches) for a first predetermined time period, or completely OFF (by opening both switches sw4, sw5) for a second predetermined time period. These time periods can be counted as an integer number of oscillation cycles, and thus allows a fully digital, high-resolution ON-OFF control scheme. This leads to high energy efficiency (ratio of light versus power consumption). By choosing a suitable first and second predetermined time period, any desired duty cycle and thus light intensity level can be generated. It is noted that this duty cycle can be chosen substantially independently from the switching frequency of the balancing switches sw1H, sw1L, sw2H, sw2L described in FIG. 1(a). Furthermore, since the ON and OFF cycles can be arbitrarily distributed over an update cycle ("dithering"), visual aberrations can be reduced.

FIG. 9 illustrates the behaviour of the voltage regulator of FIG. 8.

FIG. 9(a) shows the voltage swing from about +17.5V to about −7.5V, resulting in the above mentioned 27 Vpp. FIG. 9(b) illustrates an exemplary light emission when using the circuit of FIG. 8. FIG. 9(c) illustrates both the instantaneous input power of the voltage regulator $P_{in}$, and the instantaneous power efficiency η (eta). FIG. 9(d) illustrates the voltage across and the current through the two regulator switches, which is a measure for the switching losses.

While the present invention is described with reference to particular examples, the present invention is not limited thereto, and other variations to the disclosed embodiments can be understood and effected by those skilled in the art in practicing the claimed invention, from a study of the drawings, the disclosure, and the appended claims.

For example, while most drawings are shown with three modules, each driving a respective load, the present invention also works for a system having three modules but only two loads. In this case, the third module would not drive a load but is used for balancing the input voltages.

While the three loads in one example were three resistors, and in another example were three LEDs, the present invention is not limited to loads of the same type, can also be used to drive different kinds of loads, such as for example LEDs transmitting visible light, UV LEDs, LiFi, radar or other detectors or sensors.

In some embodiments described above, the modules, in particular the voltage regulators are described to be controlled by means of a wired connection, but that is not absolutely required, and the voltage regulators may also be controlled wirelessly. In this case, the control circuit would further comprise a transceiver circuit (not shown), for example based on Bluetooth or ZigBee, or any other wireless communication standard.

In the embodiments described above, three modules are interconnected such that the supply voltage is divided by two. In such configuration, the input capacitors C1, C2 of the first and the second module are connected in series, and the input capacitor C3 of the third module is alternatingly connected to the input capacitor of the first module and the second module. But the present invention is not limited to systems having three modules, and systems according to the present invention can also have more than 3 modules, for example 5 modules. In this case, the input capacitors of three modules would be connected in series (first stage), while the input capacitors of the second stage modules are configured to be alternatingly connected to two adjacent modules of the first stage. In particular, the input capacitor of the fourth module would be alternatingly connected to one of the upper two modules of the first stage, and the input capacitor of the fifth module would be alternatingly connected to the lower two modules of the first stage.

This principle is not limited to only 5 modules (3 in the first stage+2 in the second stage), but can be extended to systems with a much larger number of modules, for example 19 modules (in which case the supply voltage would be divided by 10), or 39 modules (in which case the supply voltage would be divided by 20). In general, a system using this topology would have 2N−1 modules, namely: N modules in the first stage, and (N−1) in the second stage. In this way, systems, e.g. solid state lighting devices can be formed, which are powered from a single DC supply having a voltage in the range from about 7.5 V to 24V, or from 7.5V to about 50V, or from 7.5V to 200V, or from 7.5V to 400V, or from 7.5V to 600V, for example for street light applications.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope thereof.

The invention claimed is:

1. A system comprising:
   a first, second and third module each comprising an electronic circuit comprising:
   an input capacitor connected between a first node and a second node;
   a first switch and a second switch connected in series between said first node and said second node, in parallel with said input capacitor, and defining an intermediate node at their interconnection;
   a voltage regulator configured for receiving power from said input capacitor and for providing output power at a configurable voltage between an output node and the second node;
   wherein the first node of the second module is connected to the second node of the first module,
   and wherein the intermediate node of the second module is connected to the second node of the third module;
   and wherein the intermediate node of the first module is connected to the first node of the third module;
   and wherein the system further comprises a system controller configured for providing a switch control signal of at least 2 MHz to at least the first and the second module, wherein the first and second switch of at least the first and second module are being toggled at a balancing frequency of at least 2 MHz, in such a way that:
   during a first moment in time, the first switch of the first and second module are configured to be closed while the second switch of the first and second module are configured to be open,
   and during a second moment in time, the first switch of the first and second module are configured to be open while the second switch of the first and second module are configured to be closed,
   thereby causing charge distribution between the input capacitor of the first, and second and third module.

2. The system according to claim 1, wherein the electronic circuit further comprises an output capacitor connected between the output node and the second node for stabilizing the output voltage.

3. The system according to claim 1, wherein the electronic circuit further comprises a control unit configured for receiving a switch control signal via a fourth node, and for generating a first switch signal to control the first switch, and for generating a second switch signal to control the second switch.

4. The system according to claim 3, wherein the control unit is further configured for receiving an output control signal via a fourth node and for providing this output control signal, or a signal derived therefrom to the voltage regulator to control the configurable voltage.

5. The system according to claim 1,
   further comprising a light emitting diode connected at the output of the voltage regulator.

6. The system according to claim 1,
   wherein the voltage regulator is a linear voltage regulator;
   or wherein the voltage regulator is a switched inductor converter,
   or wherein the voltage regulator is a resonant or a hybrid switched capacitor converter.

7. The system according to claim 6,
   wherein the voltage regulator is a resonant switched capacitor converter or a hybrid switched capacitor converter comprising at least one capacitor and at least one inductor connected in series with said capacitor,
   wherein the capacitor has a value in the range from 400 pF to 1.4 nF;
   wherein the inductor has a value in the range from 40 nH to 160 nH.

8. The system according to claim 6,
   wherein the voltage regulator is a resonant switched capacitor converter or a hybrid switched capacitor converter comprising at least two switches, configured to switch at a frequency in the range from 20 MHz to 60 MHz.

9. The system according to claim 8, wherein each module comprises a light emitting diode;
   or wherein the system further comprises at least three discrete light emitting diodes, each connected to an output of one module.

10. The system according to claim 1, wherein the system controller is further configured for providing a first output control signal to the first module, and a second output control signal to the second module, and a third output control signal to the third module.

11. A display device comprising a plurality of pixels organized in rows and columns, comprising a plurality of systems according to each system forming one pixel of said display device.

\* \* \* \* \*